(12) United States Patent
Frank, Jr. et al.

(10) Patent No.: US 6,546,489 B1
(45) Date of Patent: Apr. 8, 2003

(54) DISK DRIVE WHICH PROVIDES A SECURE BOOT OF A HOST COMPUTER SYSTEM FROM A PROTECTED AREA OF A DISK

(75) Inventors: Charles W. Frank, Jr., Irvine, CA (US); Thomas D. Hanan, Mission Viejo, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 0 days.

(21) Appl. No.: 09/262,952

(22) Filed: Mar. 4, 1999

(51) Int. Cl.[7] .................................................. G06F 11/30
(52) U.S. Cl. ...................... 713/187; 713/188; 713/189; 713/190; 713/193
(58) Field of Search ............................... 713/1, 2, 188, 713/189, 190, 193, 187

(56) References Cited

U.S. PATENT DOCUMENTS

| | | | |
|---|---|---|---|
| 5,022,077 A | | 6/1991 | Bealkowski et al. |
| 5,136,713 A | | 8/1992 | Bealkowski et al. |
| 5,287,519 A | * | 2/1994 | Dayan et al. ................ 713/202 |
| 5,341,421 A | * | 8/1994 | Ugon ........................... 380/52 |
| 5,377,264 A | * | 12/1994 | Lee et al. ..................... 713/189 |
| H1414 H | * | 2/1995 | Borgen ......................... 380/21 |
| 5,430,865 A | * | 7/1995 | Lazik ............................. 713/2 |
| 5,432,939 A | * | 7/1995 | Blackledge, Jr. et al. ... 713/200 |
| 5,432,950 A | * | 7/1995 | Sibigtroth .................... 713/193 |
| 5,712,973 A | * | 1/1998 | Dayan et al. ................ 713/200 |
| 5,802,069 A | | 9/1998 | Coulson |
| 5,809,337 A | | 9/1998 | Hannah et al. |
| 5,835,760 A | | 11/1998 | Harmer |
| 5,844,986 A | | 12/1998 | Davis |
| 6,185,507 B1 | * | 2/2001 | Huber et al. .................. 702/30 |

* cited by examiner

Primary Examiner—Thomas R. Peeso
Assistant Examiner—Kambiz Zand
(74) Attorney, Agent, or Firm—Milad G. Shara, Esq.; Myers Dawes & Andras; Ramin Mobarhan, Esq.

(57) ABSTRACT

A computer system comprises a host computer having a memory array and a host microprocessor, and a disk drive having a drive microprocessor. The disk drive provides a secure boot load of the host computer by causing the host microprocessor to remain in an inactive state while a template for loading host computer memory is read by a drive microprocessor from a protected area of the disk and loaded into host memory via the host interface. The host computer may then be activated with a memory image source whose source is impervious to virus attack or inadvertent corruption. A method is disclosed for creating and updating the secure template. The host interface may be an I/O interface or a memory referenced interface.

16 Claims, 8 Drawing Sheets

DISK DRIVE WHICH PROVIDES A SECURE BOOT OF A HOST COMPUTER SYSTEM FROM A PROTECTED AREA OF A DISK

BACKGROUND OF THE INVENTION

1. Field of the Invention

This invention relates to the field of secure boot loading of a computer system from a hard disk drive. In particular, the invention relates to a source for fast restoration of a complete operating image in computer system memory which is secure from attack by a virus or inadvertent corruption during operation of the computer.

2. Description of the Prior Art and Related Information

Most computer systems today take the form of a so-called "personal computer" or PC which has evolved into a ubiquitous tool applied in many forms. Examples include desktop systems, servers, and "embedded" systems which incorporate a PC as the engine for performing dedicated functions. Common to most of these systems is a host microprocessor and a disk drive. The host microprocessor executes program code, including operating system code and application program code, and reads or writes data in conjunction with code execution. The code and associated data is stored for execution in a volatile random access memory array. The disk drive provides non-volatile secondary storage for the code and data. The extent of disk drive storage is orders of magnitude greater than the memory array, allowing numerous application programs, and potentially a plurality of operating systems, to reside on the disk drive for recall according to dynamic configurations of the machine.

The memory array is initially loaded during a bootstrap (boot) loading process which begins with the host microprocessor executing a relatively small BIOS program stored in a ROM. The BIOS program reads a default area of the disk which stores a boot program, known as a boot record, and stores the program in the memory array. The host microprocessor then executes the boot program to load an operating system core which may then complete the process of establishing an operating image in memory.

Unfortunately, the PC is susceptible to problems during this process. Computer viruses are rampant, many of which plant themselves in the boot record or in the operating system code on the disk so that they may be activated during operation of the machine. Other forms of computer viruses simply corrupt or destroy code on the disk which prevents the machine from booting up at all. Aside from virus attacks, it is possible that inadvertent corruption of disk data can prevent a proper boot of the computer system. This can be caused by user mistakes or by rogue applications which fail to abide by conventions or operating system safeguards.

Many tactics have been employed to defend the data on the disk drive from virus attack. One method was to provide BIOS code which monitored disk drive write commands to look for attempted boot record modification. This and similar BIOS-based methods depend on virus software employing BIOS calls to access the disk and therefore may be ineffective when a virus bypasses BIOS. Another known method employs bus snooping hardware which monitors the I/O bus to trap disk write operations to protected areas. All these methods are prone to defeat because the host processor is required to access the data and may be controlled by a virus.

In another aspect, it is known in the art to provide an abridged version of BIOS in ROM and use the ROM BIOS to load the full BIOS from the disk drive or some other alterable memory. Since the BIOS itself is susceptible to attack or corruption in these implementations, there have been efforts to provide protection. One such a system is disclosed in U.S. Pat. No. 5,022,077 to Bealkowski et al. Bealkowski discloses having the host processor send a command to the disk drive after a BIOS is loaded to establish a maximum block address. The BIOS code is stored on the disk at addresses which are higher than the maximum block address and are therefore inaccessible until the maximum block address is reset. This method also presents the requirement that the host processor controls the protection scheme and the protection method can be easily defeated.

A more complex BIOS protection scheme is disclosed in U.S. Pat. No. 5,844,986 to Davis. The Davis patent discloses a cryptographic coprocessor which acts as a gatekeeper to BIOS stored in a flash memory. The cryptographic coprocessor responds to BIOS addresses presented by the host microprocessor during BIOS reads and requires decoding an encrypted code to process updates to the BIOS. The Davis patent provides a solution to BIOS security but adds cost from flash memory and an additional processor, and does not address potential contamination of operating system code. Further, Davis admits that an intruder can corrupt the code if the secret key is obtained.

Yet another problem experienced by PC users is the time required to perform the boot load process. The operating system code on the disk drive is a complex arrangement of linked blocks which are loaded in many stages with considerable processing required. In addition, most complex operating systems require a previous orderly shut-down to achieve an efficient start-up. Unfortunately, the orderly shut-down is sometimes as lengthy as the boot process. One known solution to the boot load delay, sometimes known as "resume from disk" or "hibernation," has been to store the system memory image in special partition on the disk drive. A subsequent start-up operation retrieves the image and resumes at the prior state of the machine. This solution is advantageous when starting the machine, but still presents a significant shut-down delay. Further, the image on disk is susceptible to virus attack or corruption as noted above.

There is a continuing need, therefore, for a computer system boot process which is fast and secure from virus attack or inadvertent corruption.

SUMMARY OF THE INVENTION

This invention can be regarded as a computer system comprising a host computer, a disk drive, and means defining a host interface between the host computer and the disk drive. The host computer comprises a host microprocessor having an inactive state and an active state. The host microprocessor has an input for receiving a state-control signal and while the state-control signal is asserted remains in the inactive state, and while the state-control signal is de-asserted remains in the active state. While in the active state, the host microprocessor executes host-executable code including operating system and application program code. The host computer further comprises a memory array for storing the host-executable code and data, means coupled between the memory array and the host interface for reading from and writing to the memory array; and means responsive to a signal on the host interface for asserting and de-asserting the state-control signal.

The disk drive comprises a disk having disk addresses for storing and retrieving data including data defining a host computer memory image source, means for storing and retrieving drive-executable code including code defining a boot control program, and a drive microprocessor for executing the drive-executable code including the boot control program.

The host computer memory image source is stored at disk addresses which are accessible by the drive microprocessor when executing the boot control program and which are protected from access by the host computer. The host computer memory image source further comprises an address pointer to establish an address in the memory array for storing at least a portion of the memory image source.

The computer system further comprises means for transferring the host computer memory image source to the memory array via the host interface while the drive microprocessor is executing the boot control program means controlled by the drive microprocessor for causing the state-control signal to be asserted.

The invention may be used with a host interface which is either a memory referenced interface or an I/O interface.

In another aspect, the invention may be viewed as a method for providing a secure boot load image in a computer system comprising a disk drive and a host computer. The method comprises the steps of providing a host memory image source; providing a protected area of the disk sufficient to store the host memory image source; providing an encrypted code; providing code executable in the disk drive to prevent access to the protected area by the host computer unless the protected area command and the encrypted code is sent to the disk drive by the host computer; transmitting the protected area command and the encrypted code to the disk drive; transmitting the host memory image source to the disk drive; and storing the host memory image source in the protected area.

Preferably the encrypted code is derived from the disk drive serial number. The image source may be stored as a contiguous image or as a compressed image.

In another aspect, the step of providing a host memory image source may include the steps of connecting to a remote distribution site; transmitting an identification code which uniquely identifies the computer system to the remote distribution site; downloading the host memory image source from the remote distribution site; and validating the host memory image source.

In still another aspect, the invention can be summarized as a method for securely booting the aforementioned computer system. The method comprises the steps of asserting the state control signal; executing the boot control program with the drive microprocessor to retrieve a host memory image source from the disk drive; and while the boot control program is executed and the state-control signal is asserted, transferring the host memory image to the memory array.

The foregoing and other features of the invention are described in detail below and set forth in the appended claims.

DETAILED DESCRIPTION

Figure 1:
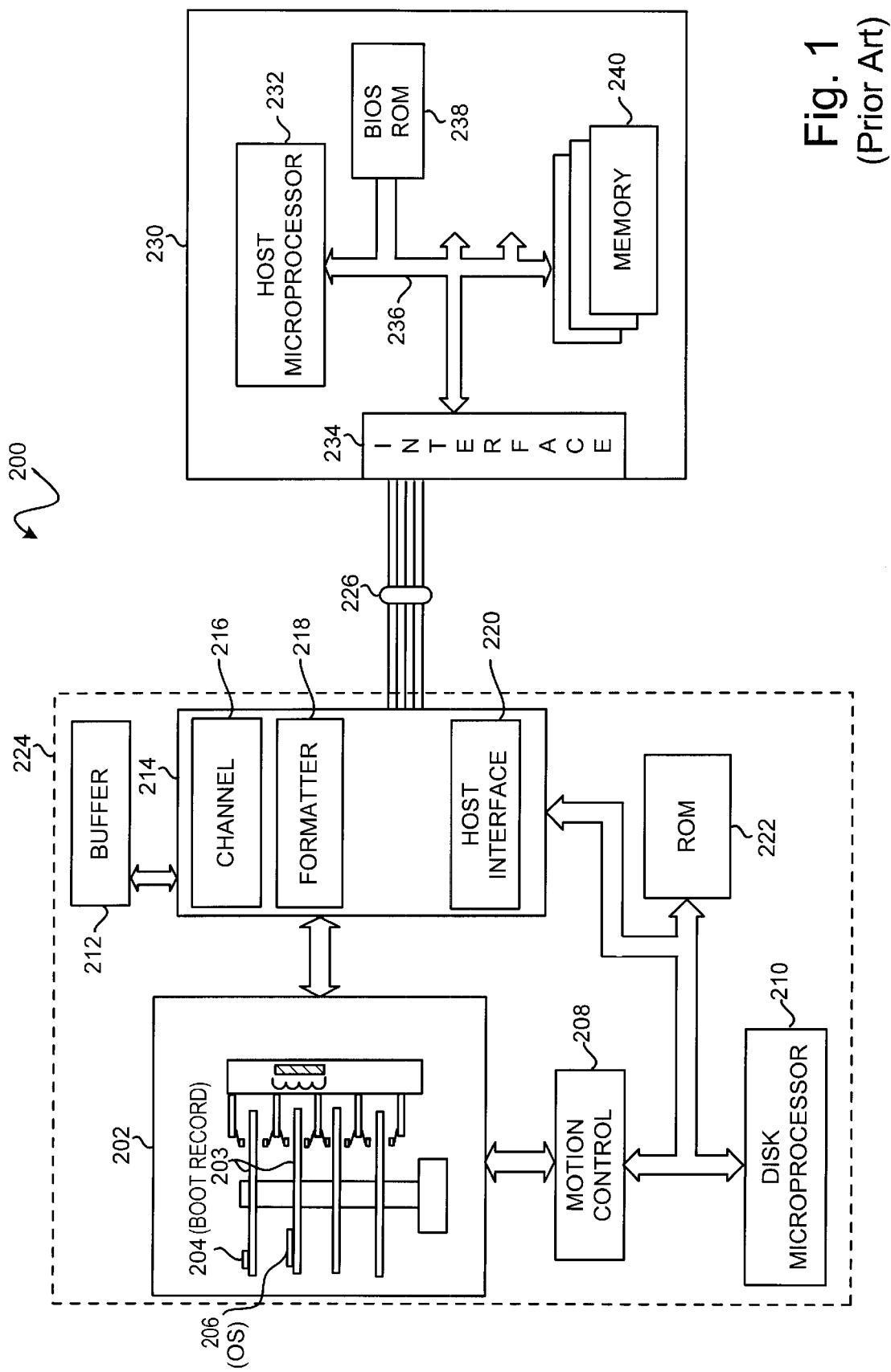
FIG. 1 is a prior art computer system with a BIOS ROM in the host computer and a conventional disk drive storing a boot record and an operating system.

FIG. 1 shows a prior art computer system 200 comprising a disk drive 224 and a host computer 230. A host interface 226 is defined between host computer 230 and disk drive 224 which is conventionally an IDE (sometimes known as ATA) or SCSI interface. Various forms of the IDE or SCSI interface, complying with particular specifications, are in use which provide different levels of performance and function.

Disk drive 224 comprises a head disk assembly (HDA) 202 and a set of controller integrated circuits 214 which may be integrated in various forms. HDA 202 comprises one or more rotating disks 203 (4 shown) mounted on a spindle motor and a moveable head stack assembly having head transducers for accessing data on the disks. The spindle motor and the head stack assembly are controlled by a motion control circuit 208 which provides current drivers and control logic. A channel 216 provides signal processing including encoding and decoding for data transferred to and from the head transducers. A formatter 218 provides block level digital processing of disk data and may include error correction and detection logic. A buffer 212 provides temporary storage of data being read from or written to the disk and may be implemented in form of a cache memory. A host interface 220 provides logic and drivers to respond to host interface 226. A drive microprocessor 210 executes code to control disk operations and manage a queue of commands from the host. A ROM 222 stores initialization code executed by drive microprocessor 210.

Host Computer 230 comprises a host microprocessor 232, a BIOS ROM 238, a memory array 240, and a host interface circuit 234 which drives and responds to host interface 226. Bus 236 connects host computer 232 to the aforementioned elements. In this simplified diagram, conventional components such as memory control logic or other peripheral devices are omitted, but are well known to those skilled in the art.

During a boot load process, host microprocessor 232 executes code in BIOS ROM 238 to access a boot record 204 on disk 203 and proceeds thereupon to load an operating system image in memory from operating system source 206 stored on one or more disks 203. As previously indicated, boot record 204 and operating system source 206 are subject to contamination by a computer virus or inadvertent modification.

Figure 2:
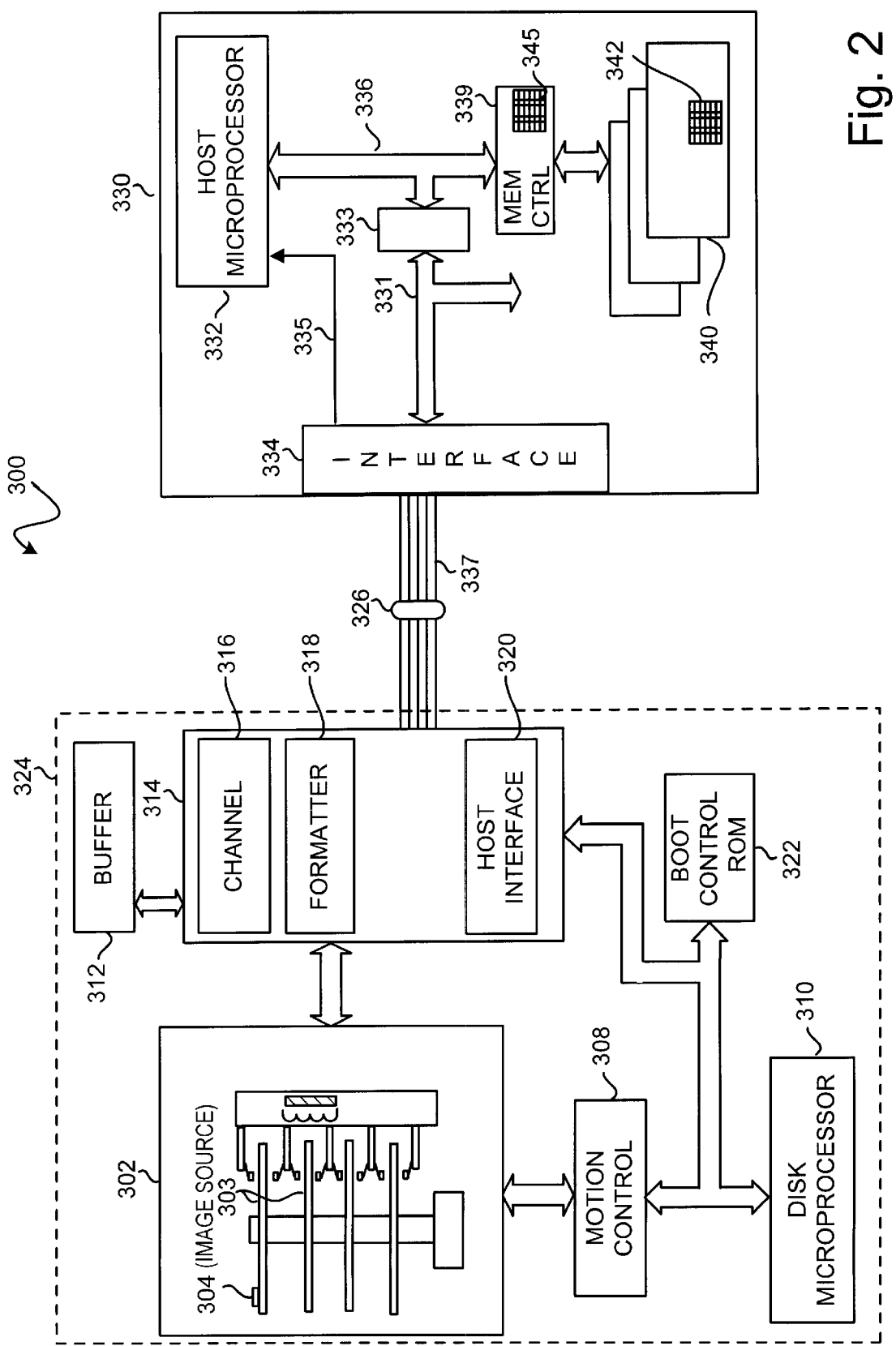
FIG. 2 is a computer system according to an embodiment of this invention employing a memory-referenced host interface between the disk drive and the host computer.

FIG. 2 illustrates a computer system 300 according to an embodiment of the invention comprising host computer 330 and disk drive 324. Host computer 330 comprises host microprocessor 332, host local bus 336, memory controller 339, memory array 340, Peripheral Component Interface (PCI) bridge 333, local PCI bus 331 and host interface control logic 334. Host microprocessor 332 has an active state when executing instructions, and an inactive state brought about by the assertion of a state-control signal such as a reset or hold signal, both well known in the art. In the inactive state, host microprocessor 332 is prevented from accessing memory array 340. Host microprocessor 332 is suitably a Pentium™ class microprocessor, although other microprocessor families may be used with equal advantage. Host interface logic 334 preferably comprises a memory based interface such as a PCI expansion bus coupled to disk drive 324 via host interface bus 326 and coupled to memory array 340 via PCI bridge 333 and memory controller 339. Other memory referenced interfaces including both serial and parallel types may be employed. The memory referenced interface between disk drive 324 and host computer 330 enables disk drive 324 to load data into memory array 340 via host interface 334, local PCI bus 331, PCI bridge 333, and memory controller 339.

Disk drive 324 comprises channel 316, formatter 318, motion control 308, buffer 312 and HDA 302, comprising disks 303. A drive microprocessor 310 executes a disk control program to initialize the disk drive. A portion of the storage capacity on disks 303 is partitioned to provide a protected area of disk addresses which are known to the disk control program, but are inaccessible to host computer 330. The protected area is sufficient to store an image source 304 suitable to recreate a fully functional operating image in memory 340. When computer system 300 is initialized, such as following a power-up sequence, host interface controller 320 asserts a state-control signal 337 which is translated in host interface 334 to assert internal state-control signal 335, thereby causing host microprocessor 332 to be maintained in an inactive state such as reset or hold.

After state-control signal 337 is asserted, drive microprocessor 310, executing code in boot control ROM 322, reads a host memory image source 304 from the above-mentioned protected area of disk 303 and generates addresses and data therefrom for writing into memory array 340 via the preferred PCI interface to host computer 330. Host interface controller 320 provides logic and buffering for interfacing between the host interface PCI bus 326 and drive microprocessor 310. When memory array 340 has been loaded with the operating image from host memory image source 304, state-control signal 337 is de-asserted, thereby allowing host microprocessor 332 to resume an active state and begin executing the host-executable code stored in memory array 340.

In one embodiment, a portion of host memory image source 304 comprises a BIOS code set. To ensure the security of the BIOS code set, disk microprocessor 310 uses the memory referenced access path described above to store the BIOS code in a portion 342 of memory array 340, and writes to registers 345 in memory controller 339 to write-protect the portion 342 of memory array 340 from being overwritten. Preferably, one or more of the registers 345 stores a code which must be provided to memory controller 339 in order to enable portion 342 to then be overwritten after the protection is established.

The just described process provides an efficient and fully secure boot load of computer system 300. There is no requirement for code to be executed by host microprocessor 332 during the restoration of an operating image in memory array 340. Consequently there is no requirement for a BIOS ROM in host computer 330 and overall no opportunity for a virus to contaminate the operating image stored on disk. The time required to restore the operating image may be significantly shorter than prior art boot loads or even resume from disk operations, because no intervening processing is necessary.

Figure 5:
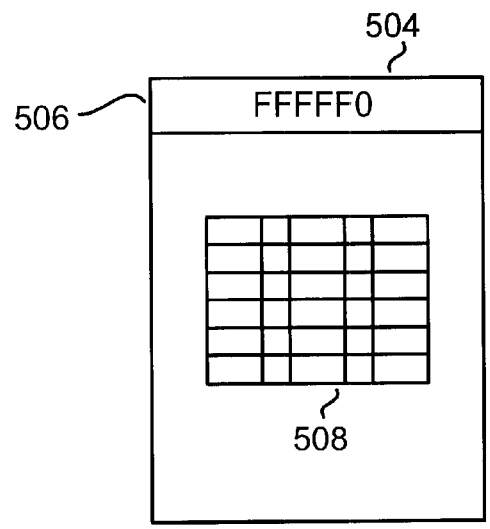
FIG. 5 is a representation of the host memory image source stored on disk with an address pointer and the image template.

Turning to FIG. 5, a diagram of one embodiment 504 of the host image source stored on disk is shown. An address pointer 506 provides a starting memory address location in memory array 340 to begin loading data. Following address pointer 506, a contiguous block of data 508 is provided representing the host memory image. Numerous embodiments of host image source 304 are possible within the scope of the invention including compressed images, non-contiguous images with interspersed address pointers and encrypted images.

Figure 3:
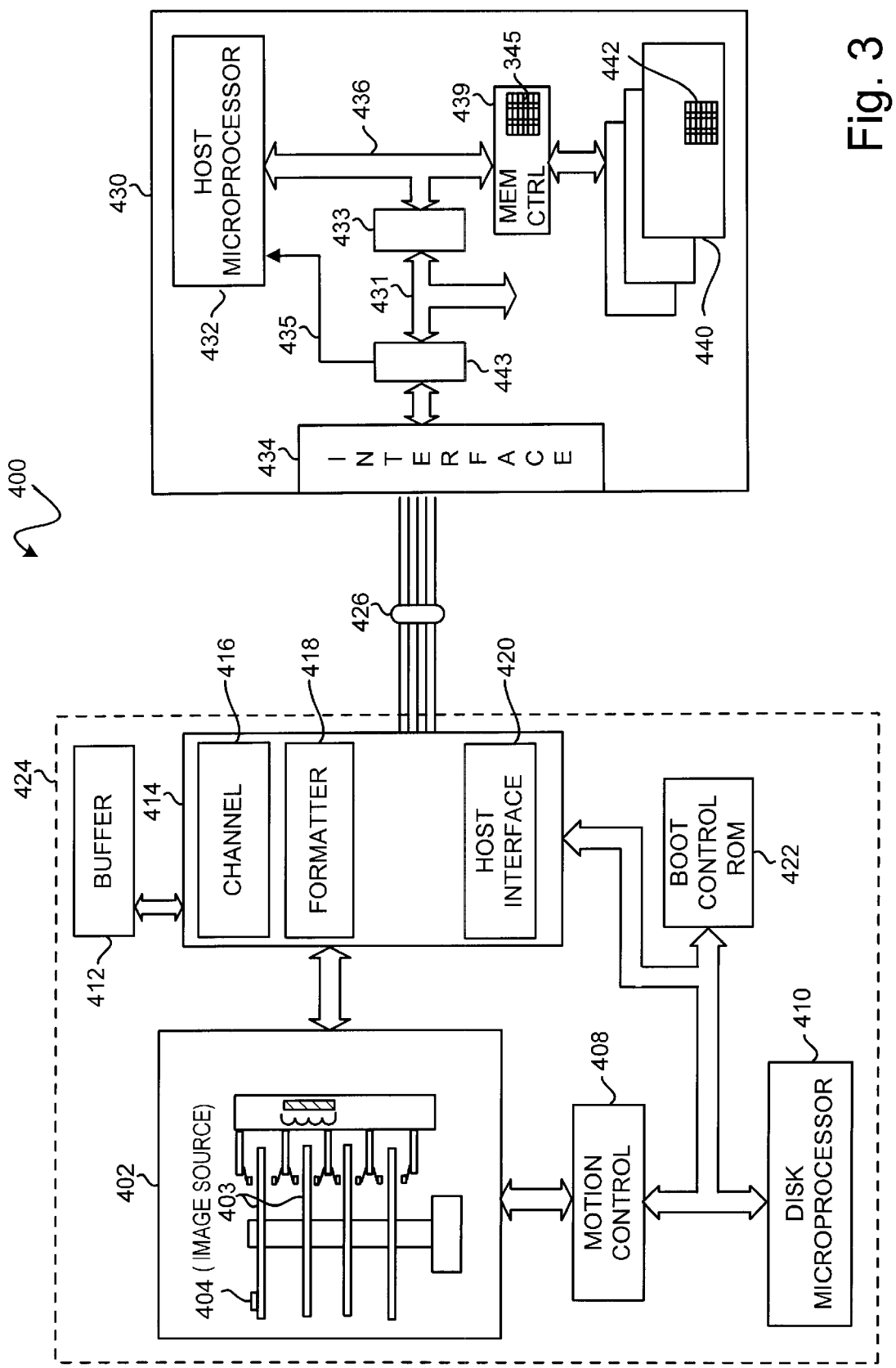
FIG. 3 is a computer system according to another embodiment of this invention employing an I/O host interface between the disk drive and the host computer, and providing a coprocessor on the host computer for cooperating with the disk drive microprocessor to cause the host microprocessor to be inactivated and a secure host memory image to be loaded into memory.

FIG. 3 shows an alternate embodiment of the invention where an I/O interface is used to connect a host computer and a disk drive. Computer system 400 comprises host computer 430 and HDA 424. In general, elements in FIG. 3 are comparably numbered with FIGS. 1 and 2 (e.g. HDA's 202,302,402) so that only those elements which are most relevant to the invention need be discussed.

Host interface 426, supported by host interface controller 420 within disk drive 424 and interface control logic 434 in host computer 430, is preferably an IDE interface. A SCSI or other standard I/O interface may alternatively be used. When the invention is used with an I/O interface instead of a memory referenced interface such as PCI, some intervening control logic must be employed to address memory array 440. A boot load micro-controller 443 in host computer 430 monitors signals from host interface logic 434 for a boot request from disk drive 424, typically following a power-up or system reset sequence. Upon recognizing that a boot load sequence is in progress, micro-controller 443 asserts state-control signal 435 to cause host microprocessor 432 to enter an inactive state. Subsequently, micro-controller 443 receives boot load address and data information from disk drive 424 and writes the data into memory array 440 at the indicated addresses. Upon completion of the boot load, state-control signal 435 is de-asserted by micro-controller 443 and host microprocessor 432 returns to an active state and executes the program just loaded.

In order to write protect a portion 442 of memory array 440 comparable to the process discussed above for FIG. 2, microcontroller 443 receives register data from disk microprocessor 410 and writes the data into registers 445 in memory controller 439.

Figure 6:
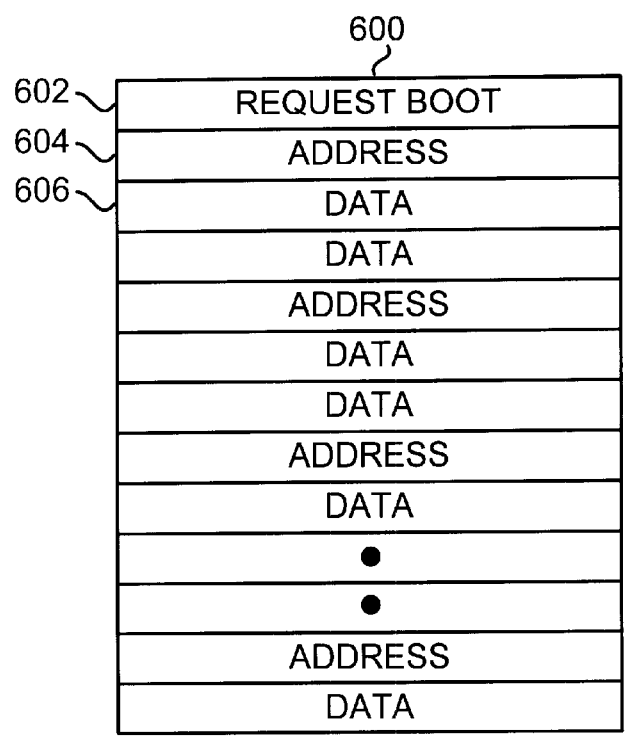
FIG. 6 is a representation of the protocol for transmitting the host memory image over a host interface which is an I/O interface such as IDE or SCSI.

FIG. 6 shows a sequence 600 of data which may be communicated by disk drive 424 to micro-controller 443 during the boot load process. Sequence 600 comprises a request boot code 602 which is recognized by micro-controller 443 to assert state-control signal 435. Subsequently a stream of address 604 and data words 606 may be transmitted to transmit the host memory image source to memory array 440.

Figure 9:
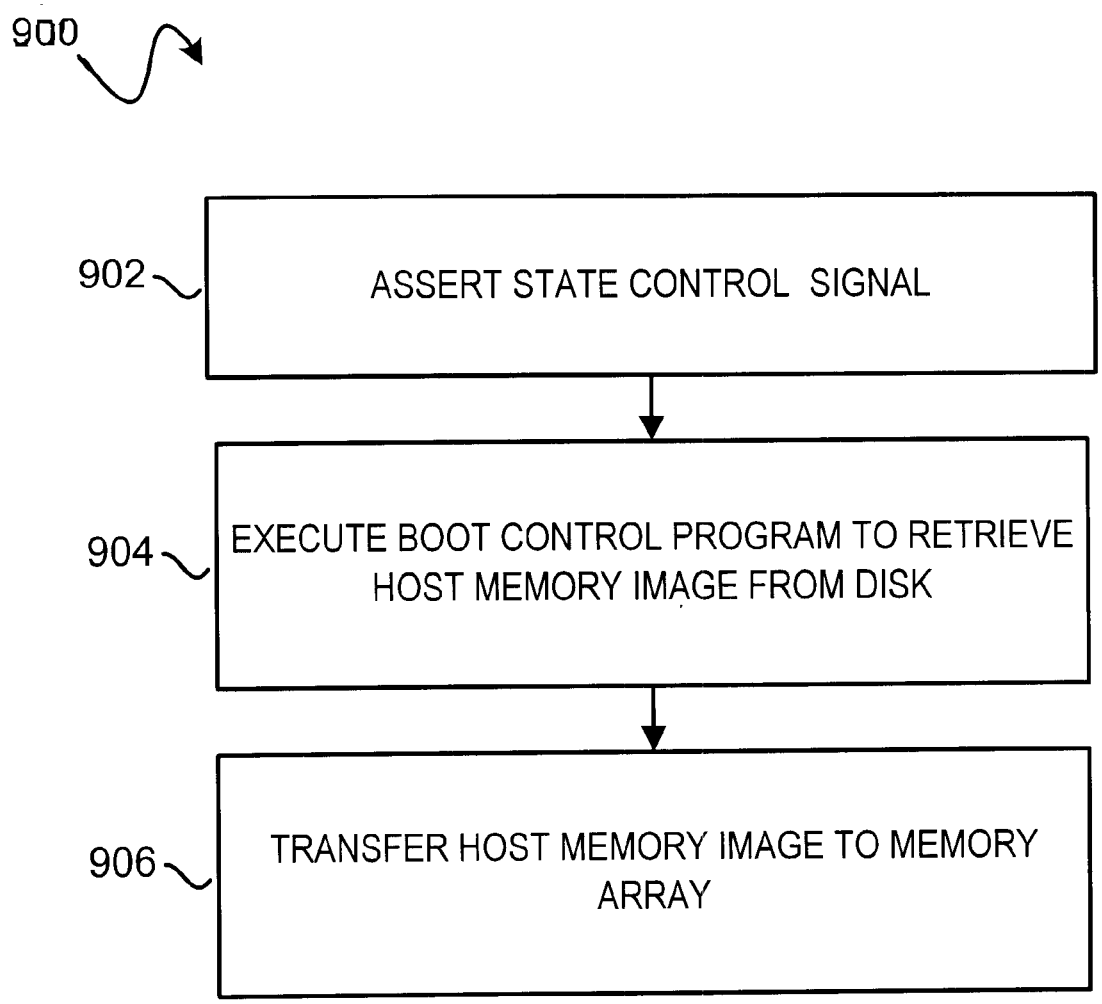
FIG. 9 is a flow chart showing the method of the invention for providing a secure boot of a host computer from a protected area of the disk drive.

FIG. 9 summarizes the method of the invention 900 to perform a secure boot load of a computer system. In step 902, the state-control signal is asserted by the drive microprocessor to cause the host microprocessor to enter an inactive state. In step 904, the drive microprocessor executes a boot control program to retrieve the host memory image from disk. The method proceeds to step 906 where the drive microprocessor transfers the host memory image to the memory array.

Figure 4:
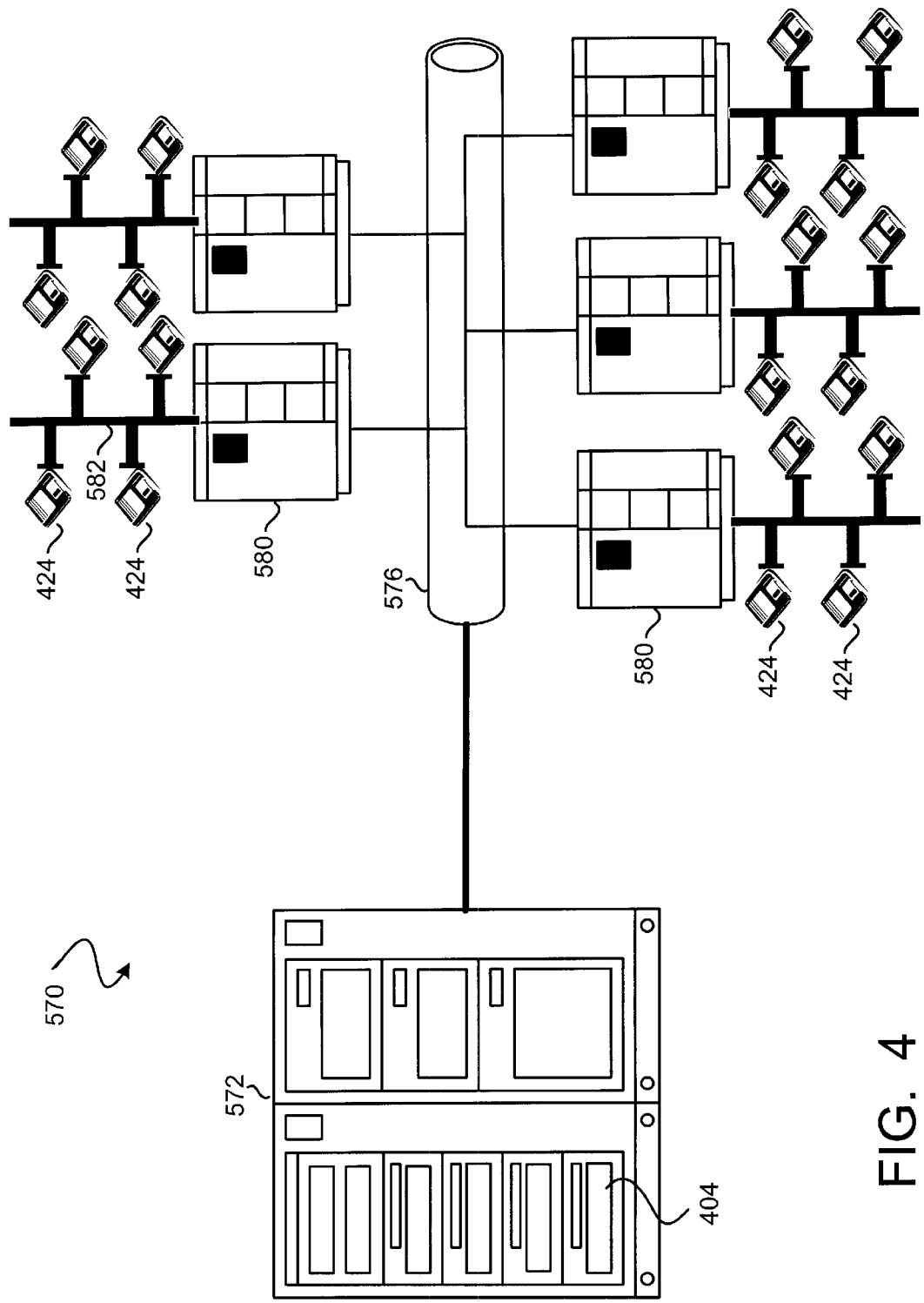
FIG. 4 is block diagram of a test system which is suitable for loading the secure host memory image source onto the disk drive.

FIG. 4 shows a system 570 which is suitable for manufacturing disk drives with a pre-loaded host memory image source in a protected area of the disk. System 570 comprises a mainframe or central computer system 572, a plurality of disk drive test systems 580 (5 shown) and a plurality of disk drives 424 connected to the disk drive test systems via host interfaces 582. A network 576 provides a communication link between mainframe 572 and the plurality of disk drive test systems 580. In principle, manufacturing system 570 is similar to the system disclosed in commonly assigned pending U.S. patent application Ser. No. 08/873,230, the disclosure of which is hereby incorporated by reference. Mainframe 572 maintains a copy of host operating image source 404 in its internal storage bay and provides the copy to each test system 580 for transmittal to disk drives 424. Each disk drive 424 is assigned a bar coded serial number upon its introduction to test system 580 and thus is able to form an unique encrypted code which is preferably derived from its serial number. Since the drive serial number and the algorithm used for generating the encrypted code are known to the test system 580, the drive can be induced to accept a write operation to its protected area. The algorithm may also take into account other parameters known only to system 570 and the disk drive, and these other parameters may be employed later in the disk drive's life to enable an update of the host memory image source after leaving the factory. System 570 provides for a record of the encrypted code for this use, and further provides sufficient capacity for simultaneously manufacturing numerous versions of disk drives or disk drive based systems with various unique host memory image source files.

Figure 7:
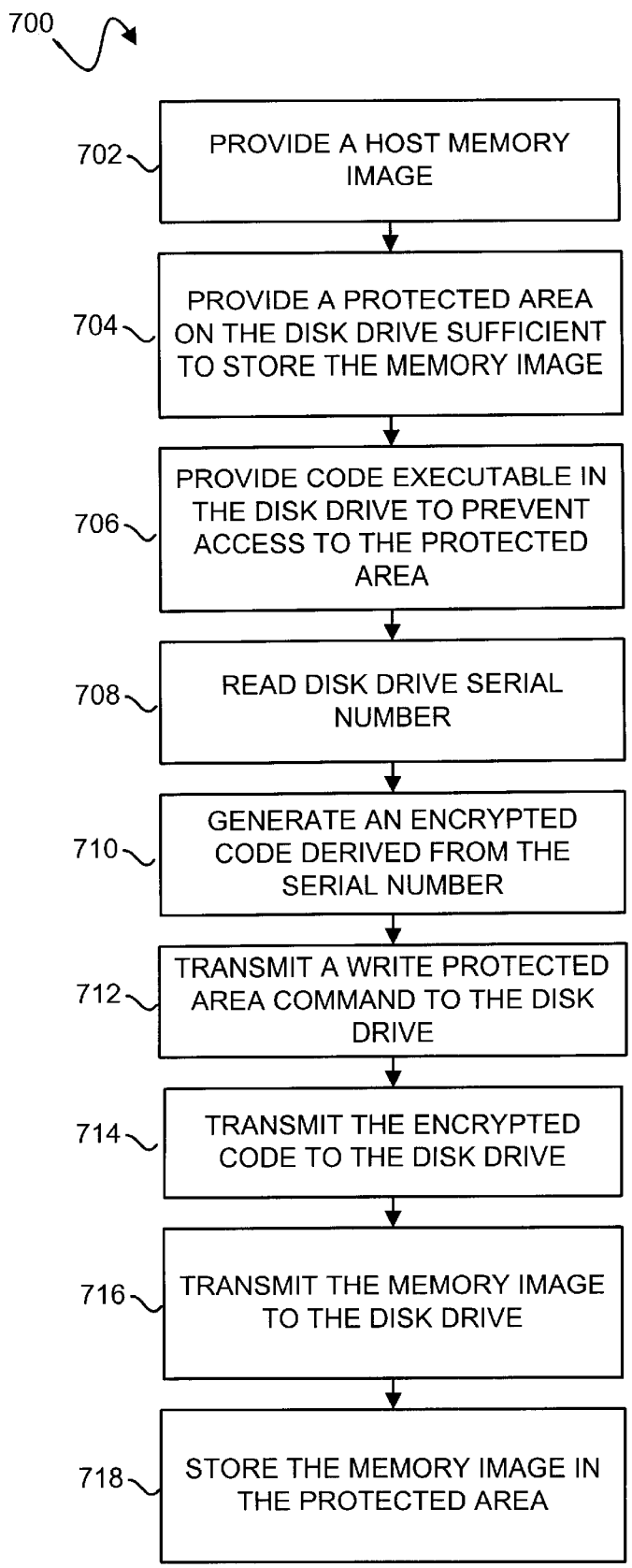
FIG. 7 is a flow chart showing the method of the invention for initially providing a host memory image and storing it in a protected area of the disk drive, such as during manufacturing of the disk drive.

FIG. 7 illustrates a preferred method 700 of the invention for providing the host memory image source to the disk drive and storing it thereupon. In step 702 a host memory image is provided as discussed above. In step 704, the disk drive provides a protected area sufficient to store the host memory image source. In step 706, the drive is provided with code executable in the disk drive to prevent access to the protected area unless an enabling command and code sequence is received. In step 708 the disk drive serial number is obtained. In step 710, an encrypted code which is at least partially derived from the disk drive serial number is computed. In step 712, a command to write in the protected area is transmitted to the disk drive. In step 714, the encrypted code is transmitted to the disk drive. In step 716, the host memory image source is transmitted to the disk drive. Finally in step 718, the host memory image source is stored in the disk protected area, having been enabled by transmitting the special command and the encrypted code. Preferably an additional algorithm is employed which in which the host memory image source includes some form of self-verification which may be appending syndrome or CRC bytes or other methods which ensure that the image is valid.

Figure 8:
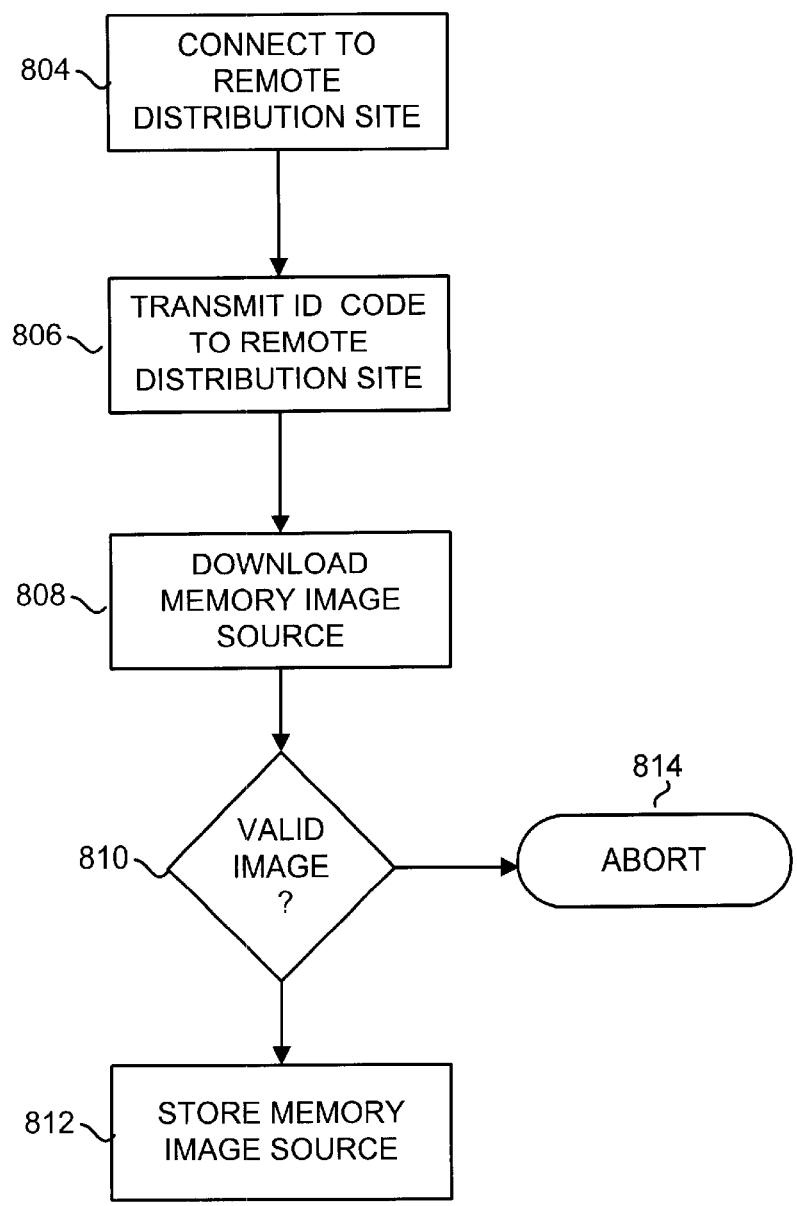
FIG. 8 is a flow chart showing an alternate embodiment of the method of the invention for accessing a remote site to provide an updated host memory image and store it in a protected area of the disk drive.

FIG. 8 shows an alternate embodiment 800 of the method step of providing a host memory image source which may be applied to update the image after the drive has been installed in a user's computer system. In step 804, the computer system is connected a remote distribution site such as the manufacturer's Internet web site. In step 806, the computer system transmits an ID code to the remote distribution site. In step 808, the host memory image source is downloaded. In step 810, the image is validated by the disk drive. If the image is not valid, the process is aborted at step 814, otherwise a valid image is stored in the protected area at step 812.

We claim:

1. A computer system comprising:

a host computer;

a disk drive;

means defining a host interface between the host computer and the disk drive;

the host computer comprising:

a host microprocessor having an inactive state and an active state, the host microprocessor having an input for receiving a state-control signal and while the state-control signal is asserted remaining in the inactive state, and while the state-control signal is de-asserted remaining in the active state and therein executing host-executable code including operating system and application program code;

a memory array for storing the host-executable code and data;

means coupled between the memory array and the host interface for reading from and writing to the memory array;

means responsive to a signal on the host interface for asserting and de-asserting the state-control signal;

the disk drive comprising:

a disk having disk addresses for storing and retrieving data including data defining a host computer memory image source;

means for storing and retrieving drive-executable code including code defining a boot control program;

a drive microprocessor for executing the drive-executable code including the boot control program;

the host computer memory image source being stored at disk addresses which are accessible by the drive microprocessor when executing the boot control program and which are protected from access by the host computer;

the host computer memory image source further comprising an address pointer to establish an address in the memory array for storing at least a portion of the memory image source;

means for transferring the host computer memory image source to the memory array via the host interface while the drive microprocessor is executing the boot control program; and means controlled by the drive microprocessor for causing the state-control signal to be asserted.

2. The computer system of claim 1 wherein the host interface is a memory-referenced interface.

3. The computer system of claim 2 wherein the memory-referenced interface is a PCI bus.

4. The computer system of claim 2 wherein the means for transferring the host computer memory image source comprises bus mastering circuits.

5. The computer system of claim 1 wherein the host interface is an I/O interface.

6. The computer system of claim 5 wherein the means coupled between the memory array and the host interface comprises a boot load microcontroller which is operable while the state-control line is asserted.

7. The computer system of claim 6 further comprising a means for the boot load microprocessor to detect a boot request sequence on the host interface.

8. A method for securely booting a computer system comprising a disk drive and a host computer, the host computer being coupled to the disk drive via a host interface; the disk drive comprising a drive microprocessor, a boot control program executable by the drive microprocessor and a means for causing a state-control signal to be asserted; the host computer further comprising a memory array and a host microprocessor, the method comprising:

asserting the state-control signal from the disk drive to hold the host microprocessor in an inactive state wherein the host microprocessor is prevented from accessing the memory array when the state control signal is asserted;

executing the boot control program with the drive microprocessor to retrieve a host memory image from the disk drive; and while the boot control program is executed and the state-control signal is asserted, transferring the host memory image to the memory array.

9. The method of claim 8, further comprising:

de-asserting the state-control signal from the disk drive to restore the host microprocessor to an active state wherein the host microprocessor is allowed to access the memory array when in an active state; and accessing the transferred host memory image from the memory array by the host microprocessor.

10. The method of claim 9, wherein the host memory image is retrieved from an area of the disk drive protected from access by the host computer.

11. The method of claim 8, wherein the disk drive further comprises a disk, wherein host memory image is retrieved from a protected area of the disk sufficient to store the host memory image, and wherein a code executable in the disk drive prevents the host computer from accessing to the protected area unless a protected area command and a predetermined encrypted code are sent to the disk drive by the host computer.

12. The method of claim 11, further comprising:

transmitting the protected area command and the encrypted code to the disk drive to enable writing data in the protected area;

transmitting the host memory image to the disk drive; and storing the host memory image in the protected area prior to the asserting.

13. The method of claim 11, wherein the encrypted code is derived from a serial number of the disk drive.

14. The method of claim 11, further comprising:

compressing the host memory image prior to the storing wherein the host memory image stored in the protected area is the compressed host memory image.

15. The method of claim 8, wherein the computer system is in communication with a remote distribution site and wherein the method further comprising:

transmitting a unique identification code of the computer system to the remote distribution site;

receiving the host memory image from the remote distribution site; and validating the received host memory image.

16. The method of claim 15, wherein the remote distribution site is in communication with the computer system via the Internet.

* * * * *